United States Patent
Yoshii et al.

(10) Patent No.: US 7,853,217 B2
(45) Date of Patent: Dec. 14, 2010

(54) WIRELESS COMMUNICATION TERMINAL APPARATUS AND CQI SELECTING METHOD

(75) Inventors: Isamu Yoshii, Kanagawa (JP); Eiko Seidel, Munich (DE); Christian Wengerter, Kleinheubach (DE); Alexander Golitschek Edler Von Elbwart, Darmstadt (DE); Kenichi Miyoshi, Kanagawa (JP); Daichi Imamura, Kanagawa (JP); Akihiko Nishio, Kanagawa (JP); Kenichi Kuri, Kanagawa (JP)

(73) Assignee: Panasonic Corporation, Osaka (JP)

( * ) Notice: Subject to any disclaimer, the term of this patent is extended or adjusted under 35 U.S.C. 154(b) by 539 days.

(21) Appl. No.: 12/063,841
(22) PCT Filed: Aug. 17, 2006
(86) PCT No.: PCT/JP2006/316136
§ 371 (c)(1),
(2), (4) Date: Feb. 14, 2008
(87) PCT Pub. No.: WO2007/020958
PCT Pub. Date: Feb. 22, 2007

(65) Prior Publication Data
US 2009/0111384 A1 Apr. 30, 2009

(30) Foreign Application Priority Data
Aug. 18, 2005 (JP) .............................. 2005-238020

(51) Int. Cl.
*H04B 17/00* (2006.01)
(52) U.S. Cl. ................. 455/67.11; 455/67.13; 455/450; 455/452.2; 455/63.1; 455/550.1; 455/62; 455/69; 455/561; 455/403; 455/522; 370/252; 370/342; 370/329; 370/318; 370/441; 375/346; 375/348
(58) Field of Classification Search ............. 455/67.11, 455/67.13, 63.1, 550.1, 62, 450, 452.2, 403, 455/69, 561, 522
See application file for complete search history.

(56) References Cited

U.S. PATENT DOCUMENTS 7,013,143 B2 * 3/2006 Love et al. .................. 455/450
(Continued)

FOREIGN PATENT DOCUMENTS

JP 2001-051622 2/2001
(Continued)

OTHER PUBLICATIONS

International Search Report dated Nov. 7, 2006.
US 6,759,681, 07/2004, Yamazaki (withdrawn)

*Primary Examiner*—Marceau Milord
(74) *Attorney, Agent, or Firm*—Dickinson Wright PLLC

(57) ABSTRACT

A wireless communication terminal apparatus and a CQI selecting method wherein when CQIs are grouped according to their levels and then an upper-order CQI, which is indicative of a group, is to be informed in a longer period, while a lower-order CQI, which identifies a CQI in the group, being to be informed in a shorter period, the CQI is precisely selected. A reception SIR range of 0-4 dB in UE corresponds to a level 1 of upper-order CQI. A next reception SIR range of 4-8 dB corresponds to a level 2 of upper-order CQI. Similarly, the following SIR ranges up to 24 dB, each of which is 4 dB higher than a respective previous one, correspond to the respective following levels of upper-order CQI. On the other hand, the levels 1-4 of lower-order CQI, with which the level 1 of upper-order CQI is associated, correspond to a SIR range of −1-5 dB. The levels 1-4 of lower-order CQI, with which the level 2 of upper-order CQI is associated, correspond to a SIR range of 2-9 dB. Thus, the SIR ranges, to which the lower-order CQIs correspond, overlap the respective SIR ranges corresponding to the respective adjacent levels of upper-order CQIs with which the lower-order CQIs are associated.

5 Claims, 11 Drawing Sheets

U.S. PATENT DOCUMENTS

| | | | |
|---|---|---|---|
| 7,103,325 B1 * | 9/2006 | Jia et al. | 455/101 |
| 7,236,474 B2 * | 6/2007 | Seo et al. | 370/329 |
| 7,272,396 B2 * | 9/2007 | Obuchi et al. | 455/436 |
| 7,319,718 B2 * | 1/2008 | Roh et al. | 375/224 |
| 7,502,310 B2 * | 3/2009 | Hwang et al. | 370/208 |
| 7,536,154 B2 * | 5/2009 | Rudolf et al. | 455/69 |
| 7,590,181 B2 * | 9/2009 | Awad et al. | 375/259 |
| 7,688,798 B2 * | 3/2010 | Dottling et al. | 370/345 |
| 7,764,743 B2 * | 7/2010 | Farag | 375/265 |
| 7,783,327 B2 * | 8/2010 | Murata et al. | 455/567 |
| 2003/0053549 A1 | 3/2003 | Uesugi | |
| 2005/0053038 A1 | 3/2005 | Kimura | |
| 2005/0255807 A1 | 11/2005 | Araki | |

U.S. PATENT DOCUMENTS

| | | |
|---|---|---|
| JP | 2002-261851 | 9/2002 |
| JP | 2002-320262 | 10/2002 |
| JP | 2004-312458 | 11/2004 |
| JP | 2005-064963 | 3/2005 |
| JP | 2005-086304 | 3/2005 |
| JP | 2005-136773 | 5/2005 |

* cited by examiner

| CQI | SIR RANGE | HIGHER CQI | SIR RANGE | LOWER CQI | MCS LEVEL | | |
|---|---|---|---|---|---|---|---|
| | | | | | MODULATION SCHEME | CODING RATE | NUMBER OF INFORMATION BITS |
| 1 | 0-4dB | 1 | 0-4dB | 1 | QPSK+ Rep=8 | 1/8 | 100 |
| 2 | | | | 2 | | 1/4 | 200 |
| 3 | | | | 3 | | 3/8 | 300 |
| 4 | | | | 4 | | 1/2 | 400 |
| 5 | 4-8dB | 2 | 4-8dB | 1 | QPSK+ Rep=4 | 5/16 | 500 |
| 6 | | | | 2 | | 3/8 | 600 |
| 7 | | | | 3 | | 7/16 | 700 |
| 8 | | | | 4 | | 1/2 | 800 |
| 9 | 8-12dB | 3 | 8-12dB | 1 | QPSK+ Rep=2 | 9/32 | 900 |
| 10 | | | | 2 | | 5/16 | 1000 |
| 11 | | | | 3 | | 11/32 | 1100 |
| 12 | | | | 4 | | 3/8 | 1200 |
| 13 | 12-16 dB | 4 | 12-16 dB | 1 | QPSK | 1/4 | 1600 |
| 14 | | | | 2 | | 5/16 | 2000 |
| 15 | | | | 3 | | 3/8 | 2400 |
| 16 | | | | 4 | | 7/16 | 2800 |
| 17 | 16-20 dB | 5 | 16-20 dB | 1 | 16QAM | 1/4 | 3200 |
| 18 | | | | 2 | | 5/16 | 4000 |
| 19 | | | | 3 | | 3/8 | 4800 |
| 20 | | | | 4 | | 7/16 | 5600 |
| 21 | 20-24 dB | 6 | 20-24 dB | 1 | 64QAM | 1/3 | 6400 |
| 22 | | | | 2 | | 1/4 | 9600 |
| 23 | | | | 3 | | 3/4 | 14400 |
| 24 | | | | 4 | | 7/8 | 16800 |

PRIOR ART

FIG.1

| TIME | t0 | t1 | t2 |
|---|---|---|---|
| CQI DECIDED BY UE | 6 | 5 | 4 |
| CQI RECOGNIZED BY NODE B | 6 | 5 | 8 |

WRONG RECOGNITION IS MADE BETWEEN NODE B AND UE

PRIOR ART

FIG.2B

| CQI | SIR RANGE | HIGHER CQI | SIR RANGE | LOWER CQI | MCS LEVEL | | |
|---|---|---|---|---|---|---|---|
| | | | | | MODULATION SCHEME | CODING RATE | NUMBER OF INFORMATION BITS |
| 1 | 0-4dB | 1 | -1-5dB | 1 | QPSK+ Rep=8 | 1/4 | 200 |
| 2 | | | | 2 | | 1/2 | 400 |
| 3 | | | | 3 | | 3/4 | 600 |
| 4 | | | | 4 | | 7/8 | 700 |
| 5 | 4-8dB | 2 | 2-9dB | 1 | QPSK+ Rep=4 | 1/4 | 400 |
| 6 | | | | 2 | | 1/2 | 800 |
| 7 | | | | 3 | | 3/4 | 1200 |
| 8 | | | | 4 | | 7/8 | 1400 |
| 9 | 8-12dB | 3 | 6-13dB | 1 | QPSK+ Rep=2 | 1/4 | 800 |
| 10 | | | | 2 | | 1/2 | 1600 |
| 11 | | | | 3 | | 3/4 | 2400 |
| 12 | | | | 4 | | 7/8 | 2800 |
| 13 | 12-16 dB | 4 | 10-17 dB | 1 | QPSK | 1/4 | 1600 |
| 14 | | | | 2 | | 1/2 | 3200 |
| 15 | | | | 3 | | 3/4 | 4800 |
| 16 | | | | 4 | | 7/8 | 5600 |
| 17 | 16-20 dB | 5 | 14-21 dB | 1 | 16QAM | 1/4 | 3200 |
| 18 | | | | 2 | | 1/2 | 6400 |
| 19 | | | | 3 | | 3/4 | 9600 |
| 20 | | | | 4 | | 7/8 | 12600 |
| 21 | 20-24 dB | 6 | 18-25 dB | 1 | 64QAM | 1/4 | 4800 |
| 22 | | | | 2 | | 1/2 | 9600 |
| 23 | | | | 3 | | 3/4 | 14400 |
| 24 | | | | 4 | | 7/8 | 16800 |

FIG.4

| CQI | SIR RANGE | HIGHER CQI | SIR RANGE | LOWER CQI | MCS LEVEL | | |
|---|---|---|---|---|---|---|---|
| | | | | | MODULATION SCHEME | CODING RATE | NUMBER OF INFORMATION BITS |
| 1 | 0-4dB | 1 | 0-5dB | 1 | QPSK +Rep=8 | 1/8 | 100 |
| 2 | | | | 2 | | 1/4 | 200 |
| 3 | | | | 3 | | 1/2 | 400 |
| 4 | | | | 4 | QPSK +Rep=4 | 5/16 | 500 |
| 5 | 4-8dB | 2 | 2-9dB | 1 | QPSK +Rep=8 | 3/8 | 300 |
| 6 | | | | 2 | QPSK +Rep=4 | 3/8 | 600 |
| 7 | | | | 3 | | 1/2 | 800 |
| 8 | | | | 4 | QPSK +Rep=2 | 9/32 | 900 |
| 9 | 8-12dB | 3 | 6-13dB | 1 | QPSK +Rep=4 | 7/16 | 700 |
| 10 | | | | 2 | QPSK +Rep=2 | 5/16 | 1000 |
| 11 | | | | 3 | | 3/8 | 1200 |
| 12 | | | | 4 | QPSK | 1/4 | 1600 |
| 13 | 12-16 dB | 4 | 10-17 dB | 1 | QPSK +Rep=2 | 11/32 | 1100 |
| 14 | | | | 2 | QPSK | 5/16 | 2000 |
| 15 | | | | 3 | | 7/16 | 2800 |
| 16 | | | | 4 | 16QAM | 1/4 | 3200 |
| 17 | 16-20 dB | 5 | 14-21 dB | 1 | QPSK | 3/8 | 2400 |
| 18 | | | | 2 | 16QAM | 5/16 | 4000 |
| 19 | | | | 3 | | 7/16 | 5600 |
| 20 | | | | 4 | 64QAM | 1/3 | 6400 |
| 21 | 20-24 dB | 6 | 18-24 dB | 1 | 16QAM | 3/8 | 4800 |
| 22 | | | | 2 | 64QAM | 1/4 | 9600 |
| 23 | | | | 3 | | 3/4 | 14400 |
| 24 | | | | 4 | | 7/8 | 16800 |

FIG.8

CQI TABLE OF FIG.1

| CQI | HIGHER CQI | LOWER CQI | MODULATION SCHEME | CODING RATE | NUMBER OF INFORMATION BITS |
|---|---|---|---|---|---|
| 1 | 1 | 1 | QPSK +Rep=8 | 1/8 | 100 |
| 2 | 1 | 2 | QPSK +Rep=8 | 1/4 | 200 |
| 3 | 1 | 3 | QPSK +Rep=8 | 3/8 | 300 |
| 4 | 1 | 4 | QPSK +Rep=8 | 1/2 | 400 |
| 5 | 2 | 1 | QPSK +Rep=4 | 5/16 | 500 |
| 6 | 2 | 2 | QPSK +Rep=4 | 3/8 | 600 |
| 7 | 2 | 3 | QPSK +Rep=4 | 7/16 | 700 |
| 8 | 2 | 4 | QPSK +Rep=4 | 1/2 | 800 |
| 9 | 3 | 1 | QPSK +Rep=2 | 9/32 | 900 |
| 10 | 3 | 2 | QPSK +Rep=2 | 5/16 | 1000 |
| 11 | 3 | 3 | QPSK +Rep=2 | 11/32 | 1100 |
| 12 | 3 | 4 | QPSK +Rep=2 | 3/8 | 1200 |
| 13 | 4 | 1 | QPSK | 1/4 | 1600 |
| 14 | 4 | 2 | QPSK | 5/16 | 2000 |
| 15 | 4 | 3 | QPSK | 3/8 | 2400 |
| 16 | 4 | 4 | QPSK | 7/16 | 2800 |
| 17 | 5 | 1 | 16QAM | 1/4 | 3200 |
| 18 | 5 | 2 | 16QAM | 5/16 | 4000 |
| 19 | 5 | 3 | 16QAM | 3/8 | 4800 |
| 20 | 5 | 4 | 16QAM | 7/16 | 5600 |
| 21 | 6 | 1 | 64QAM | 1/3 | 6400 |
| 22 | 6 | 2 | 64QAM | 1/2 | 9600 |
| 23 | 6 | 3 | 64QAM | 3/4 | 14400 |
| 24 | 6 | 4 | 64QAM | 7/8 | 16800 |

CQI TABLE OF FIG.8

| CQI | HIGHER CQI | LOWER CQI | MODULATION SCHEME | CODING RATE | NUMBER OF INFORMATION BITS |
|---|---|---|---|---|---|
| 1 | 1 | 1 | QPSK +Rep=8 | 1/8 | 100 |
| 2 | 1 | 2 | QPSK +Rep=8 | 1/4 | 200 |
| 3 | 1 | 3 | QPSK +Rep=8 | 1/2 | 400 |
| 4 | 1 | 4 | QPSK +Rep=4 | 5/16 | 500 |
| 5 | 2 | 1 | QPSK +Rep=8 | 3/8 | 300 |
| 6 | 2 | 2 | QPSK +Rep=4 | 3/8 | 600 |
| 7 | 2 | 3 | QPSK +Rep=4 | 1/2 | 800 |
| 8 | 2 | 4 | QPSK +Rep=2 | 9/32 | 900 |
| 9 | 3 | 1 | QPSK +Rep=4 | 7/16 | 700 |
| 10 | 3 | 2 | QPSK +Rep=2 | 5/16 | 1000 |
| 11 | 3 | 3 | QPSK +Rep=2 | 3/8 | 1200 |
| 12 | 3 | 4 | QPSK | 1/4 | 1600 |
| 13 | 4 | 1 | QPSK +Rep=2 | 11/32 | 1100 |
| 14 | 4 | 2 | QPSK | 5/16 | 2000 |
| 15 | 4 | 3 | QPSK | 7/16 | 2800 |
| 16 | 4 | 4 | 16QAM | 1/4 | 3200 |
| 17 | 5 | 1 | QPSK | 3/8 | 2400 |
| 18 | 5 | 2 | 16QAM | 5/16 | 4000 |
| 19 | 5 | 3 | 16QAM | 7/16 | 5600 |
| 20 | 5 | 4 | 64QAM | 1/3 | 6400 |
| 21 | 6 | 1 | 16QAM | 3/8 | 4800 |
| 22 | 6 | 2 | 64QAM | 1/2 | 9600 |
| 23 | 6 | 3 | 64QAM | 3/4 | 14400 |
| 24 | 6 | 4 | 64QAM | 7/8 | 16800 |

WIRELESS COMMUNICATION TERMINAL APPARATUS AND CQI SELECTING METHOD

TECHNICAL FIELD

The present invention relates to a radio communication terminal apparatus and a CQI (Channel Quality Indicator) selecting method.

BACKGROUND ART

In radio communication systems, the AMC (Adaptive Modulation and Coding) technique is adopted as a transmission scheme for high-speed packet transmission for changing a modulation scheme and coding rate adaptively in response to fluctuation of propagation environment.

The AMC technique will be explained briefly below. First, downlink quality is measured all the time in a communication terminal apparatus (hereinafter "UE" which means user equipment), and transmits measurement results (with downlink quality information) to a base station apparatus (hereinafter "Node B") in uplink. Node B selects a MCS (Modulation and Coding Scheme), which is a combination of a modulation scheme and a coding rate, based on downlink quality information and transmits downlink packets using the selected MCS.

Patent Document 1 discloses an improved AMC technique. Patent Document 1 discloses techniques of: dividing transmission schemes (i.e. modulation schemes) into a plurality of groups; deciding in which group a selected transmission scheme is included; transmitting group information when the group information is changed; and transmitting information that specifies the transmission scheme from the group at regular intervals.

In addition, Patent Document 2 discloses another improved AMC technique. Patent Document 2 discloses a technique of reporting downlink quality information in a long period (long cycle) than the TTI (Transmission Time Interval), selecting a communication terminal preliminarily based on the report, and further reporting downlink quality information on the preliminarily-selected communication terminal in a short cycle.

There may be a technique described below, provided by combining the technique disclosed in above-described Patent Document 1 and the technique disclosed in above-described Patent Document 2. In this case, CQI is used for downlink quality information to be transmitted from UE to Node B.

FIG. 1 illustrates a CQI table. In this figure, there are 24 levels of CQI's and these 24 levels are divided into six groups per four levels each. These groups are specified by six higher CQI levels and the four levels in each group are specified by four lower CQI levels. For example, when the CQI level is 7, the higher CQI level is 2 and the lower CQI level is 3. In this case, the matching modulation scheme is QPSK (with a repetition factor of four), coding rate R is 7/16, and the number of information bits is 700.

Here, the number of information bits is the number of data bits not yet subjected to coding to be actually transmitted. For example, the CQI of level 1 and the CQI of level 2 have the same number of bits after coding, 800 bits, but have different numbers of bits before coding, 100 bits and 200 bits, respectively. Further, in this case, the higher CQI is reported in a long cycle and the lower CQI is reported in a short cycle.

Next, a case will be described below using FIGS. 2A and 2B where CQI is reported to Node B using the CQI table shown in FIG. 1. FIG. 2A illustrates changes of received SIR (Signal to Interference Ratio) in UE over time, where the vertical axis is SIR and the horizontal axis is time. At time t0, the SIR is 5.5 dB and the CQI level is 6, so that the higher CQI of 2 and the lower CQI of 2 are reported. Likewise, at time t1, the SIR is 4.5 dB and the CQI level is 5, so that the lower CQI of 1 is reported.

Patent Document 1: Japanese Patent Application Laid-Open No. 2002-261851

Patent Document 2: Japanese Patent Application Laid-Open No. 2002-320262

DISCLOSURE OF INVENTION

Problems to be Solved by the Invention

Referring to FIG. 2A, at time t2, the SIR is 3 dB and the CQI level is 4, so that the higher CQI is 1 and the lower CQI is 4. However, time t2 is not in the higher CQI report cycle, and so the lower CQI level 4 alone is reported. Consequently, at Node B, the higher CQI is 2 and the lower CQI is 4, so that the CQI level is recognized to be 8, resulting in a wrong CQI recognition between UE and Node B, as shown in FIG. 2B. That is, during a long cycle, even when there is SIR fluctuation over the higher CQI level, there is a problem that the higher CQI cannot be changed.

It is therefore an object of the present invention to provide a radio communication terminal apparatus and a CQI selecting method for enabling accurate CQI selection by dividing CQI's into groups by levels and reporting higher CQI's specifying groups in a long cycle and lower CQI's specifying CQI's in groups in a short cycle.

Means for Solving the Problem

The wireless communication terminal apparatus of the present invention employs a configuration having: a storage section that stores channel quality indicator information comprising higher channel quality indicators specifying channel quality indicator groups divided by levels and lower channel quality indicators specifying channel quality indicators in a group specified by a higher channel quality indicator and specifying part of channel quality indicators in an adjacent group of the group specified by the higher channel quality indicator; a channel quality indicator signal generating section that generates a higher channel quality indicator signal in a first cycle and a lower channel quality indicator signal in a second cycle shorter than the first cycle, according to the channel quality indicator information; and a transmitting section that transmits the generated higher channel quality indicator signal and lower channel quality indicator signal.

ADVANTAGEOUS EFFECT OF THE INVENTION

The present invention enables accurate CQI selection by dividing CQI's into groups by levels and reporting higher CQI's specifying groups in a long cycle and lower CQI's specifying CQI's in groups in a short cycle.

BRIEF DESCRIPTION OF DRAWINGS

FIG. 1 illustrates a CQI table;

FIG. 2B illustrates a higher CQI and lower CQI selection method for explanation;

FIG. 4 illustrates a CQI table provided in a CQI table storage section shown in FIG. 3;

FIG. 8 illustrates a CQI table according to Embodiment 2 of the present invention; and FIG. 9 illustrates a method of making the CQI table shown in FIG. 8.

BEST MODE FOR CARRYING OUT THE INVENTION

Embodiments of the present invention will be explained below in detail with reference to the accompanying drawings. In addition, in the following explanations, a case is assumed with embodiments of the present invention where CQI's are divided into groups by CQI levels, higher CQI's specifying groups are reported from a communication terminal apparatus (hereinafter "UE") to a base station apparatus (hereinafter "Node B") in a long cycle, and lower CQI's specifying CQI's in groups are reported from UE to Node B in a short cycle. Here, the short cycle is short and the long cycle is long with respect to a TTI (Transmission Time Interval) which is the time unit for assigning transmission data.

Embodiment 1

Figure 2A:
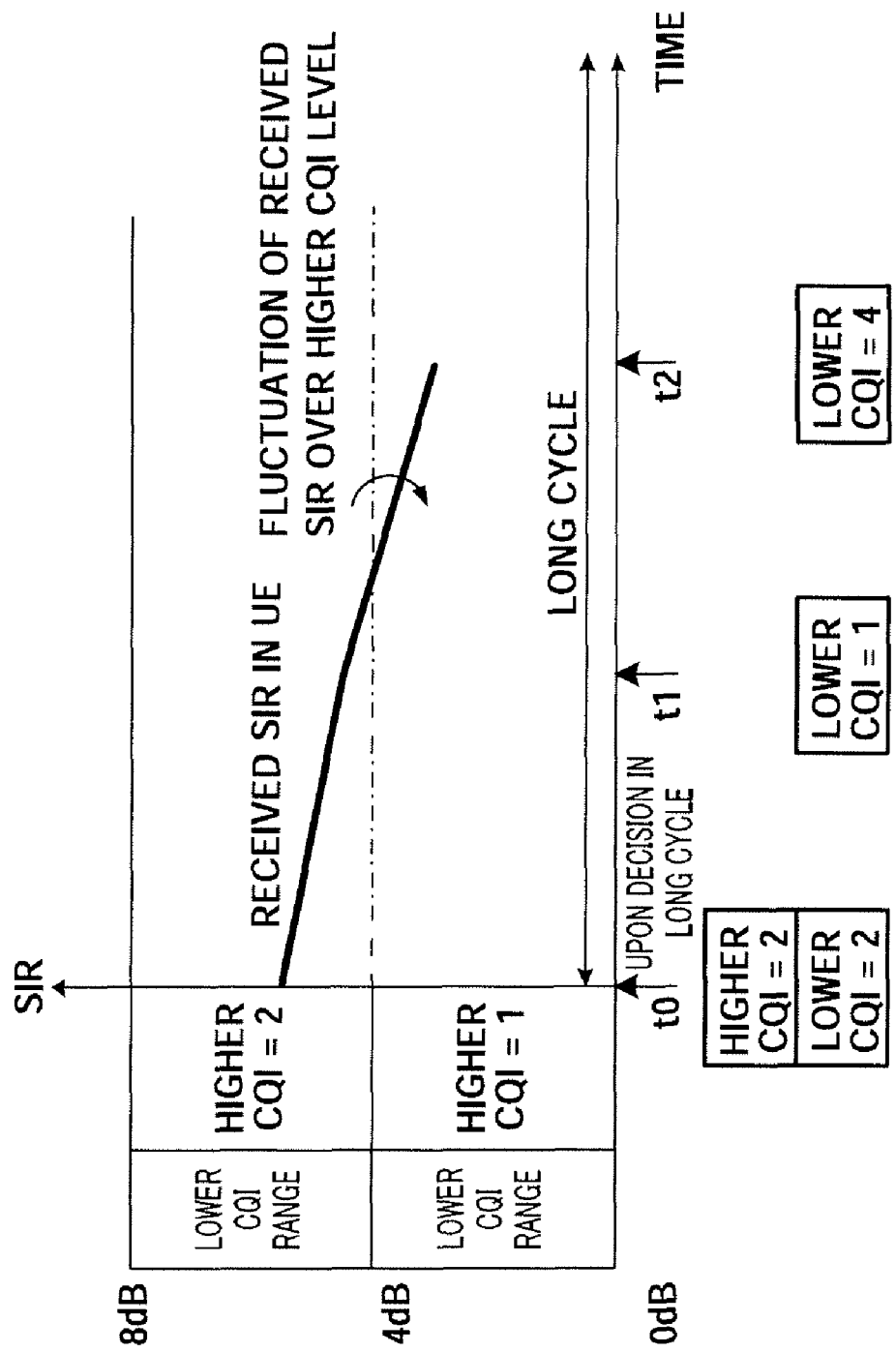
FIG. 2A illustrates a higher CQI and lower CQI selection method for explanation.
Figure 3:
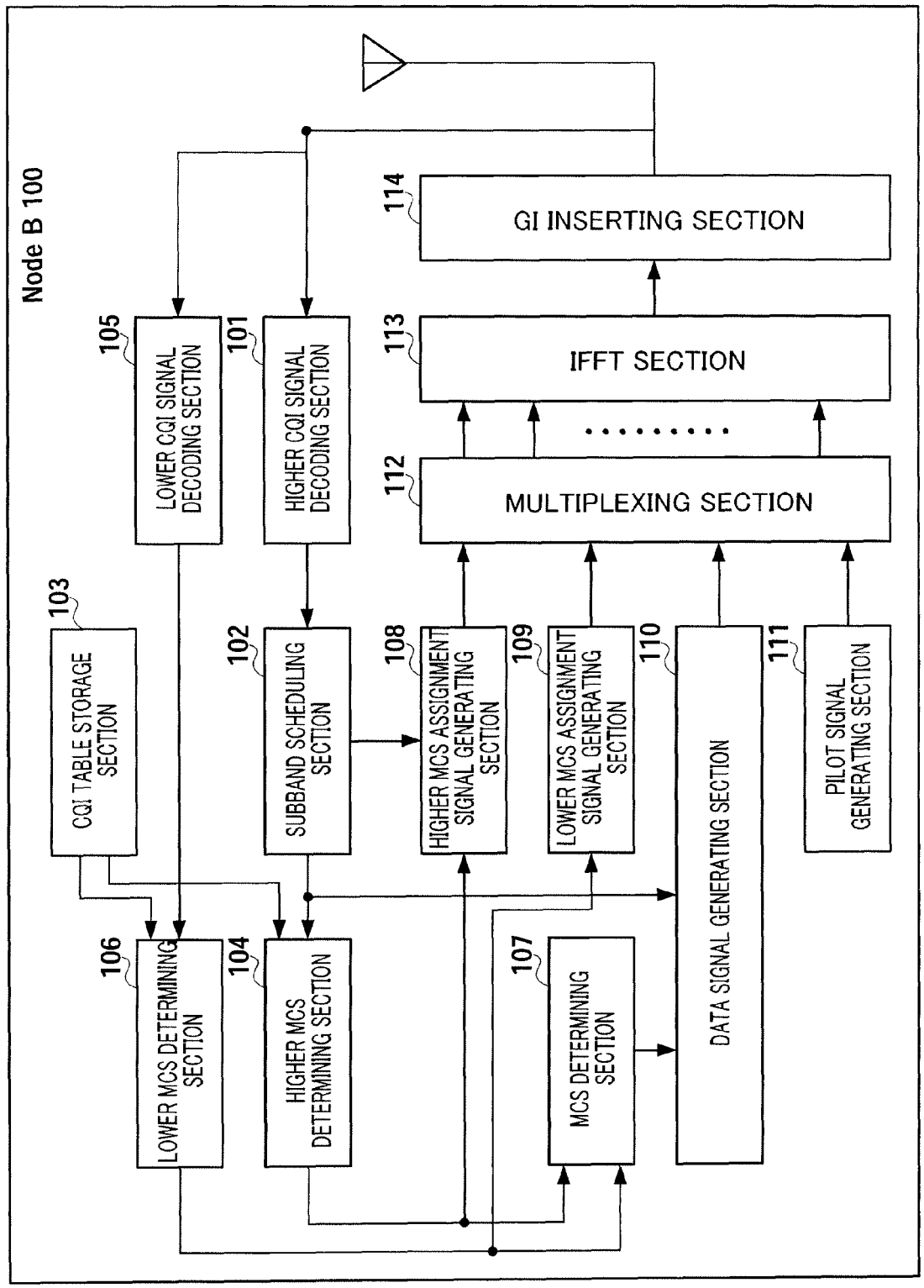
FIG. 3 is a block diagram showing a configuration of Node B according to Embodiment 1 of the present invention.

FIG. 3 is a block diagram showing the configuration of Node B 100 according to Embodiment 1 of the present invention. In this figure, higher CQI signal decoding section 101 decodes the higher CQI signals of all subbands from signals transmitted by UE and received at the antenna, and outputs the decoded higher CQI's to subband scheduling section 102.

Subband scheduling section 102 determines UE assigned per subband according to the higher CQI's of all subbands outputted from higher CQI signal decoding section 101, and outputs the determined UE's and the subband numbers assigned to the UE's (hereinafter collectively referred to as "scheduling information") to higher MCS determining section 104, higher MCS assignment signal generating section 108 and data signal generating section 110.

In CQI table storage section 103, CQI's are divided into groups by levels, and higher CQI's specifying groups and lower CQI's specifying CQI's included in the groups are associated with each other. Further, higher CQI's and lower CQI's corresponds to higher MCS's and lower MCS's, respectively. Further, the SIR of a lower CQI is set to overlap with the SIR of the higher CQI of adjacent levels of the higher CQI associated with that lower CQI. By the way, the CQI table will be described later in detail.

Higher MCS determining section 104 recognizes the UE to be assigned to a subband from scheduling information outputted from subband scheduling section 102, detects the higher MCS associated with the higher CQI of this UE from CQI table storage section 103, and determines assigning the detected higher MCS to the UE. Higher MCS determining section 104 outputs the determined higher MCS to MCS determining section 107 and higher MCS assignment signal generating section 108.

Lower CQI signal decoding section 105 decodes the lower CQI signals from signals transmitted by the UE and received at the antenna, and outputs the decoded lower CQI's to lower MCS determining section 106.

Lower MCS determining section 106 detects from CQI table storage section 103 the lower MCS associated with the lower CQI outputted from lower CQI signal decoding section 105, and determines to assign the detected lower MCS to the UE. Further, lower MCS determining section 106 outputs the determined lower MCS to MCS determining section 107 and lower MCS assignment signal generating section 109.

MCS determining section 107 determines the MCS using the higher MCS outputted from higher MCS determining section 104 and the lower MCS outputted from lower MCS determining section 106, and outputs the determined MCS to data signal generating section 110.

Higher MCS assignment signal generating section 108 generates a higher MCS assignment signal including the ID of UE assigned subbands, the subband number and the higher MCS assigned to the UE, according to the scheduling information outputted from subband scheduling section 102 and the higher MCS outputted from higher MCS determining section 104, and outputs the generated higher MCS assignment signal to multiplexing section 112.

Lower MCS assignment signal generating section 109 generates a lower MCS assignment signal according to the MCS outputted from lower MCS determining section 106 and outputs the generated lower MCS assignment signal to multiplexing section 112.

Data signal generating section 110 performs modulation and coding on data to be transmitted to the UE assigned subbands using the MCS outputted from MCS determining section 107, according to the scheduling information outputted from subband scheduling section 102, and outputs data signals subjected to modulation and coding to multiplexing section 112.

Pilot signal generating section 111 generates a pilot signal and outputs the generated signal to multiplexing section 112.

Multiplexing section 112 multiplexes the higher MCS assignment signal, the lower MCS assignment signal, the data signal and the pilot signal, and outputs the multiplex signal to IFFT section 113, and IFFT section 113 converts the frequency domain signal into a time domain signal by performing an IFFT (Inverse Fast Fourier Transform) on the multiplex signal. That is, multiplexing section 112 frequency-multiplexes the multiplex signal over a plurality of orthogonal subbands, and the multiplex signal subjected to frequency multiplexing is outputted to GI inserting section 114.

GI inserting section 114 inserts a GI (Guard Interval) into the signal outputted from IFFT section 113 and transmits the signal subjected to GI insertion to the UE via the antenna.

The CQI table provided in CQI table storage section 103 will be described below using FIG. 4. As shown in FIG. 4, there are 24 levels of CQI's and these 24 levels are divided into six groups per four levels each. These groups are specified by six higher CQI levels and the four levels in each group are specified by four lower CQI levels.

Further, according to this CQI table, the higher CQI level 1 is associated with received SIR 0 to 4 dB in the UE, the higher CQI level 2 is associated with received SIR 4 to 8 dB. Thus, received SIR is associated with higher CQI's per 4 dB up to 24 dB On the other hand, as shown in a case where SIR −1 to 5 dB is associated with the lower CQI level 1 to 4 associated with the higher CQI level 1, and where SIR 2 to 9 dB is associated with the lower CQI level 1 to 4 associated with the higher CQI level 2, the SIR of the lower CQI is set to overlap with the SIR of the higher CQI of adjacent levels of the higher CQI associated with that lower CQI.

Further, higher CQI's correspond to modulation schemes as higher MCS's, and lower CQI's correspond to coding rates and the numbers of information bits as lower MCS. For example, the higher CQI level 1 corresponds to the higher MCS level 1 (QPSK, with a repetition factor of eight), the lower CQI level 1 corresponds to the lower MCS level 1 and the coding rate R of 1/4. Here, the number of information bits is determined by the higher MCS and the lower MCS.

Figure 5:
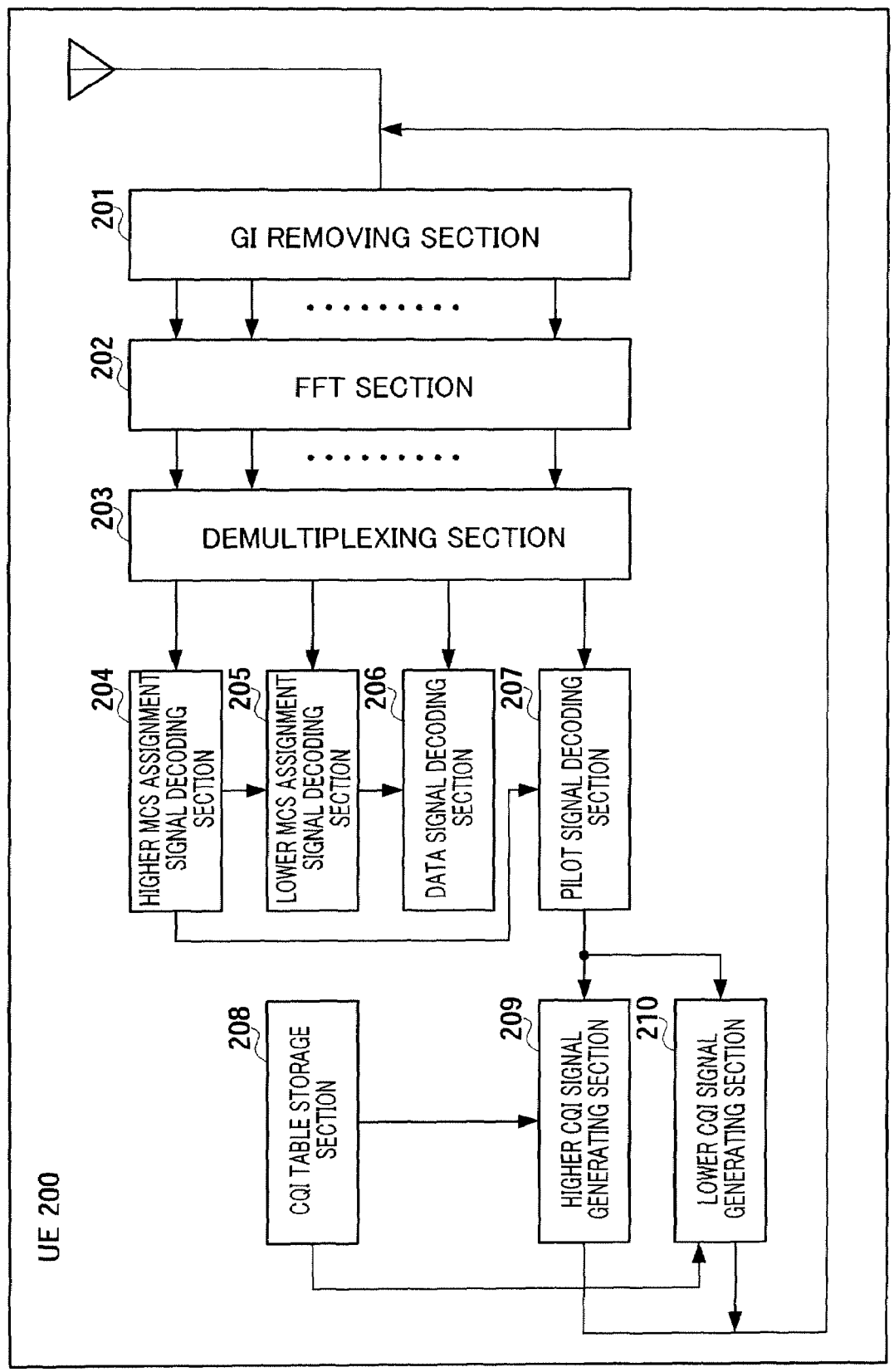
FIG. 5 is a block diagram showing a configuration of UE according to Embodiment 1 of the present invention.

FIG. 5 is a block diagram showing the configuration of UE 200 according to Embodiment 1 of the present invention. In the figure, GI removing section 201 removes a GI from the signal received in antenna and outputs the signal subjected to GI removal to FFT section 202. FFT section 202 converts the time domain signal into a frequency domain signal by performing an FFT (Fast Fourier Transform) on the signal outputted from GI removing section 201 and outputs the signal subjected to FFT to demultiplexing section 203.

Demultiplexing section 203 demultiplexes the signal outputted from FFT section 202 into the higher MCS assignment signal, the lower MCS assignment signal, the data signal and the pilot signal, and outputs the higher MCS assignment signal to higher MCS assignment signal decoding section 204, the lower MCS assignment signal to lower MCS assignment signal decoding section 205, the data signal to data signal decoding section 206 and the pilot signal to pilot signal decoding section 207. Higher MCS assignment signal decoding section 204 decodes the higher MCS assignment signal outputted from demultiplexing section 203 and decides whether or not Node B assigns the UE to subbands according to the result of decoding. The result of decision is outputted to lower MCS assignment signal decoding section 205.

Only when the decision result from higher MCS assignment signal decoding section 204 shows that subbands are assigned to the UE, lower MCS assignment signal decoding section 205 decodes the lower MCS assignment signal outputted from demultiplexing section 203. The decoded lower MCS assignment signal is outputted to data signal decoding section 206.

Data signal decoding section 206 decodes the data signal outputted from demultiplexing section 203 according to the lower MCS assignment signal outputted from lower MCS assignment signal decoding section 205.

Pilot signal decoding section 207 decodes the pilot signal outputted from demultiplexing section 203, outputs, when the decision result from higher MCS assignment signal decoding section 204 shows that subbands are assigned to the UE, the decoded signal to higher CQI signal generating section 209 and lower CQI signal generating section 210, and outputs, when the decision result from higher MCS assignment signal decoding section 204 shows that subbands are not assigned to the UE, the decoded signal to higher CQI signal generating section 209 alone.

CQI table storage section 208 stores the same CQI table as stored in CQI table storage section 103 of Node B 100.

Higher CQI signal generating section 209 measures the received SIR according to the pilot signal outputted from pilot signal decoding section 207, detects the higher CQI associated with the received SIR from CQI table 208, generates a higher CQI signal and transmits the generated higher CQI signal to Node B 100.

Lower CQI signal generating section 210 measures the received SIR according to the pilot signal outputted from pilot signal decoding section 207, detects the lower CQI associated with the received SIR from CQI table storage section 208, generates a lower CQI signal and outputs the generated lower CQI signal to Node B 100.

Figure 6:
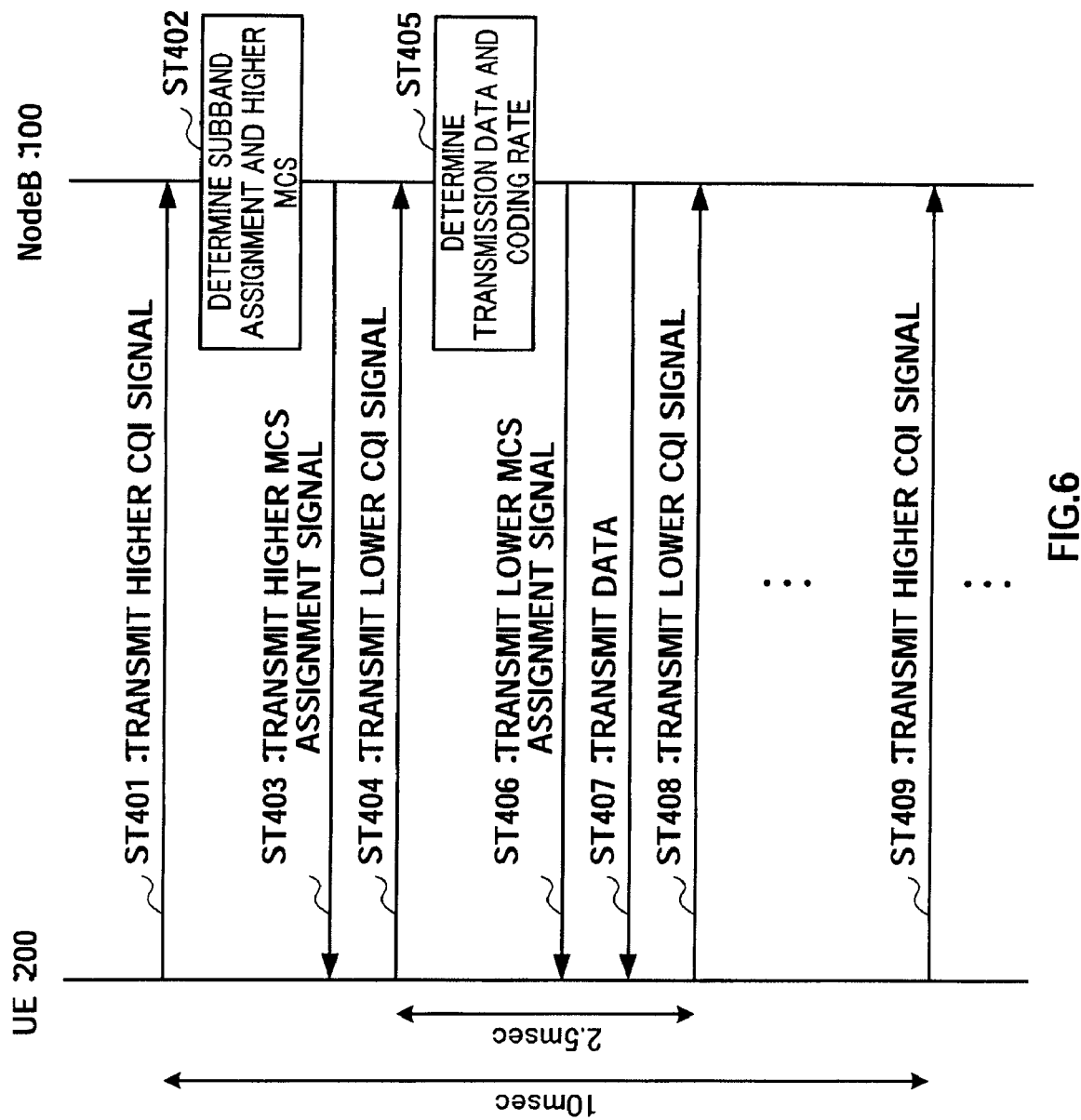
FIG. 6 is a sequence diagram showing communication steps of Node B shown in FIG. 3 and the UE shown in FIG. 5.

Next, communication steps between above-described Node B 100 and above-described UE 200 will be described below using FIG. 6. In step (hereinafter abbreviated as "ST") 401 of FIG. 6, UE 200 transmits higher CQI signals associated with received SIRs of all subbands to Node B 100, and, in ST402, Node B 100 determines subbands and the higher MCS to be assigned to UE 200 according to the higher CQI signals.

In ST403, Node B 100 transmits the higher MCS assignment signal to UE 200, and, in ST404, UE 200 transmits to Node B 100 the lower CQI signal associated with only subbands assigned by the higher MCS assignment signal.

In ST405, Node B 100 determines transmission data and its coding rate according to the higher MCS determined in ST402 and the lower CQI transmitted in ST404, and, in ST406, transmits the lower MCS assignment signal to UE 200.

In ST407, Node B 100 transmits data to UE 200, the processing in ST408 is the same as in ST404, and, after ST408, ST404 to ST407 are repeated three times in a cycle of 2.5 msecs. Further, ST409 is the same as ST401 and is performed 10 msecs after the processing of ST401 is performed.

Figure 7A:
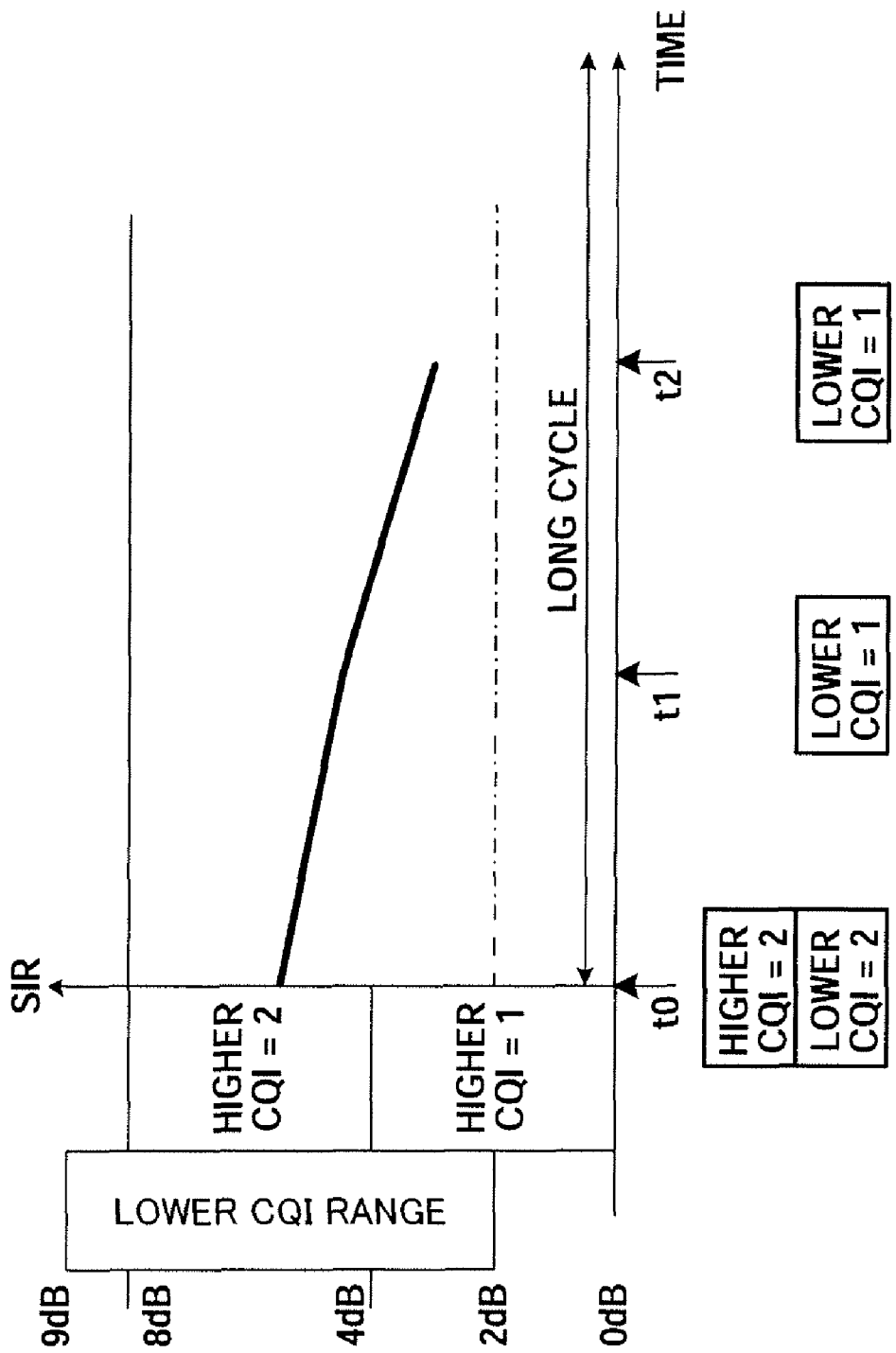
FIG. 7A illustrates a higher CQI and lower CQI selection method for explanation.
Figure 7B:
FIG. 7B illustrates a higher CQI and lower CQI selection method for explanation.

Next, a case will be described below using FIGS. 7A and 7B where CQI is selected using the CQI table shown in FIG. 4. FIG. 7A illustrates changes of received SIR in UE 200 over time, where the vertical axis is SIR and the horizontal axis is time. At time t0, the SIR is 5.5 dB and the CQI level is 6, so that the higher CQI=2 and the lower CQI=2 are reported. Further, at time t1, the SIR is 4.5 and the CQI level is 5, so that the lower CQI=1 is reported. Further, at time t2, the SIR is 3 dB and the CQI level is 5, so that the higher CQI is 2 and the lower CQI is 1. As a result, fluctuation of SIR over the higher CQI level can be responded with lower CQI's, without changing the higher CQI even in the duration of a long cycle, so that it is possible to match recognition for CQI between UE 200 and Node B 100.

As described above, according to Embodiment 1, at the UE dividing CQI'S into groups by levels and reporting higher CQI's specifying groups in a long cycle and lower CQI's specifying CQI's in groups in a short cycle, the SIR associated with a lower CQI is set to overlap with the SIR of adjacent levels of the higher CQI associated with that lower CQI, so that it is possible to respond to fluctuation of SIR over the higher CQI level, even when the higher CQI cannot be changed during a long cycle, by changing the lower CQI, consequently enabling accurate CQI selection and synchronized CQI recognition between UE and Node B.

Embodiment 2

The configuration of Node B according to Embodiment 2 of the present invention is the same as in FIG. 3 and the configuration of UE according to Embodiment 2 of the present invention is the same as in FIG. 5, and, consequently, detailed explanations thereof will be omitted. Here, the CQI table provided in CQI table storage sections 103 and 208 is different from FIG. 4, and, consequently, this CQI table will be explained using FIGS. 8 and 9.

The CQI table shown in FIG. 8 is made using the CQI table shown in FIG. 1, as shown in FIG. 9. To be more specific, in the table shown in FIG. 1, for example, the MCS level associated with the higher CQI level 2 and the lower CQI level 1 is changed such that the MCS level corresponds to the higher CQI level 1 and the lower CQI level 4, and the MCS level associated with the higher CQI level 2 and the lower CQI level 3 is changed such that the MCS level corresponds to the higher CQI level 3 and the lower CQI level 1. The above-described change is made for each higher CQI level.

As described above, by making a step width (quantization step size) of the number of information bits smaller and more delicate, it is possible to select the CQI accurately compared to the CQI table shown in FIG. 4 of Embodiment 1.

Thus, according to Embodiment 2, by making the step width of the number of information bits smaller in the CQI table, it is possible to select CQI accurately.

Although a case has been described with the above embodiments as an example where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No. 2005-238020, filed on Aug. 18, 2005, the entire content of which is expressly incorporated by reference herein.

INDUSTRIAL APPLICABILITY

The radio communication terminal apparatus and the CQI selecting method of the present invention provide an advantage of enabling accurate CQI selection and are applicable to, for example, communication terminal apparatus in OFDM radio communication systems.

The invention claimed is:

1. A radio communication terminal apparatus comprising:
a storage section that stores channel quality indicator information comprising higher channel quality indicators specifying channel quality indicator groups divided by levels and lower channel quality indicators specifying channel quality indicators in a group specified by a higher channel quality indicator and specifying part of channel quality indicators in an adjacent group of the group specified by the higher channel quality indicator;
a channel quality indicator signal generating section that generates a higher channel quality indicator signal in a first cycle and a lower channel quality indicator signal in a second cycle shorter than the first cycle, according to the channel quality indicator information; and
a transmitting section that transmits the generated higher channel quality indicator signal and lower channel quality indicator signal.

2. The radio communication terminal apparatus according to claim 1, wherein the storage section stores the channel quality indicator information setting a signal to interference ratio associated with a lower channel quality indicator to overlap with a signal to interference ratio of a higher channel quality indicator of an adjacent level to a higher channel quality indicator associated with the lower channel quality indicator.

3. The radio communication terminal apparatus according to claim 1, wherein the storage section stores the channel quality indicator information setting the number of information bits associated with the lower channel quality indicator to overlap with the number of information bits of a higher channel quality indicator of an adjacent level to the higher channel quality indicator associated with the lower channel quality indicator.

4. A radio communication base station comprising:
a receiving section that receives higher channel quality indicator signals specifying channel quality indicator groups divided by levels and lower channel quality indicator signals specifying channel quality indicators in a group specified by a higher channel quality indicator signal and specifying part of the channel quality indicators in an adjacent group of the group specified by the higher channel quality indicator;
a modulation and coding scheme assigning section that assigns a higher modulation and coding scheme signal specifying a modulation and coding scheme group divided by levels according to the received higher channel quality indicator signal;
a lower modulation and coding scheme assigning section that assigns a lower modulation and coding scheme signal specifying modulation and coding scheme in a group specified by the higher modulation and coding scheme signal or specifying part of modulation and coding scheme in an adjacent group of the group specified by the higher modulation and coding scheme signal; and
a transmitting section that transmits an assigned higher modulation and coding scheme assignment signal and an assigned lower modulation and coding scheme assignment signal.

5. A channel quality indicator selecting method comprising selecting a higher channel quality indicator in a first cycle and a lower channel quality indicator in a second cycle shorter than the first cycle, according to channel quality indicator information setting a higher channel quality indicator signal specifying a channel quality indicator group divided by levels and a lower channel quality indicator signal specifying channel quality indicator in the group specified by the higher channel quality indicator signal and specifying part of the channel quality indicator in an adjacent group of the group specified by the higher channel quality indicator.

* * * * *